(12) United States Patent
Gschwind et al.

(10) Patent No.: US 10,459,700 B2
(45) Date of Patent: Oct. 29, 2019

(54) INDEPENDENT VECTOR ELEMENT ORDER AND MEMORY BYTE ORDER CONTROLS

(71) Applicant: International Business Machines Corporation, Armonk, NY (US)

(72) Inventors: Michael Karl Gschwind, Chappaqua, NY (US); William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 15/069,704

(22) Filed: Mar. 14, 2016

(65) Prior Publication Data

US 2017/0262280 A1    Sep. 14, 2017

(51) Int. Cl.
G06F 9/38 (2018.01)
G06F 8/41 (2018.01)
G06F 9/30 (2018.01)

(52) U.S. Cl.
CPC ............ *G06F 8/41* (2013.01); *G06F 9/30036* (2013.01); *G06F 9/30076* (2013.01); *G06F 9/30189* (2013.01)

(58) Field of Classification Search
CPC .................................................. G06F 9/30036
See application file for complete search history.

(56) References Cited

U.S. PATENT DOCUMENTS

| | | | |
|---|---|---|---|
| 5,781,763 A * | 7/1998 | Beukema | G06F 13/4013 710/22 |
| 6,728,874 B1 * | 4/2004 | Sijstermans | G06F 7/768 712/222 |
| 7,376,812 B1 | 5/2008 | Sanghavi et al. | |
| 7,624,251 B2 | 11/2009 | Gonion et al. | |
| 8,856,546 B2 | 10/2014 | Gueron et al. | |
| 2005/0066146 A1 * | 3/2005 | Barry | G06F 7/768 711/201 |

(Continued)

FOREIGN PATENT DOCUMENTS

GB    2464292 A2    4/2010

OTHER PUBLICATIONS

International Business Machines Corporation, "Appendix P: List of IBM Patents or Patent Applications Treated as Related," Mar. 22, 2016, 2 pages.

(Continued)

*Primary Examiner* — Jacob Petranek
(74) *Attorney, Agent, or Firm* — Patterson + Sheridan, LLP (57) ABSTRACT

Techniques are disclosed for managing vector element ordering. One technique includes setting one or more control bits that determine a vector element ordering and a vector element numbering, where the one or more control bits are stored in a machine status register or in a page table entry. The vector element ordering includes one of a big-endian mode and a little-endian mode, and the vector element numbering includes one of a big-endian mode and a little-endian mode. The technique includes reading the one or more control bits to determine a big-endian or a little-endian mode for the vector element ordering and for the vector element numbering. The technique also includes performing a vector operation in the determined mode for the vector element ordering and the determined mode for the vector element numbering.

14 Claims, 9 Drawing Sheets

(56) References Cited

U.S. PATENT DOCUMENTS

| | | | |
|---|---|---|---|
| 2005/0125647 A1* | 6/2005 | Symes | G06F 7/768 |
| | | | 712/300 |
| 2006/0265552 A1* | 11/2006 | Davis | G06F 12/0862 |
| | | | 711/137 |
| 2007/0226469 A1 | 9/2007 | Wilson et al. | |
| 2008/0140992 A1* | 6/2008 | Rajaram | G06F 9/30025 |
| | | | 712/204 |
| 2011/0072170 A1* | 3/2011 | Flachs | G06F 9/30007 |
| | | | 710/22 |
| 2014/0019506 A1 | 1/2014 | Kuo | |
| 2014/0189231 A1* | 7/2014 | Maydan | G06F 9/30036 |
| | | | 711/110 |
| 2014/0230077 A1* | 8/2014 | Muff | G06F 9/45533 |
| | | | 726/30 |
| 2015/0019840 A1 | 1/2015 | Anderson et al. | |
| 2015/0355905 A1* | 12/2015 | Gschwind | G06F 9/30036 |
| | | | 712/7 |
| 2017/0123792 A1* | 5/2017 | Rozario | G06F 9/3012 |

OTHER PUBLICATIONS

International Business Machines Corporation, "Appendix P: List of IBM Patents or Patent Applications Treated as Related," Jun. 3, 2016, 2 pages.

Mika et al., "Use of SIMD Vector Operations to Accelerate Application Code Performance on Low-Powered ARM and Intel Platforms," IEEE, 2013, 10 pages.

* cited by examiner

INDEPENDENT VECTOR ELEMENT ORDER AND MEMORY BYTE ORDER CONTROLS

CROSS-REFERENCE TO RELATED APPLICATIONS

This application is related to U.S. patent application Ser. No. 14/300,559, titled "Vector Memory Access Instructions for Big-Endian Element Ordered and Little-Endian Element Ordered Computer Code and Data," filed Jun. 10, 2014, the contents of which are incorporated herein by reference. This application is also related to U.S. patent application Ser. No. 15/069,683, titled "Independent Vector Element Order and Memory Byte Order Controls," filed concurrently herewith, the contents of which are incorporated herein by reference.

BACKGROUND

The present disclosure generally relates to computer systems, and more specifically, to supporting big-endian (BE) and little-endian (LE) computing environments.

A computer system may implement a BE or a LE architecture. In a BE system, the most significant byte of an element in storage is stored in the smallest address in the element's memory location, and the least significant byte is stored in the largest address. In a LE system, the least significant byte of the element is stored in the smallest address in the element's memory location, and the most significant byte is stored in the largest address. For example, Intel™ systems are LE systems, while IBM z/Architecture™ systems are BE systems. Complexity is introduced with the emergence of vector processing where a single vector storage access involves a plurality of values.

Computing systems employ a byte ordering scheme and a vector element ordering (VEO) scheme. For byte ordering, a word consists of X number of bytes. A convention is used to determine whether BE or LE is used. Another convention is needed for the order of elements if we have multiple elements, such as with vectors. This convention could be the same or different than the data byte ordering. Often it is desirable to make these the same, but it may be better if they are opposite in some situations. For example, legacy systems may use a different VEO scheme than newer systems. Also, applications and code may be written for an architecture that uses one or the other VEO. It can be an expensive, long, and difficult process to rewrite code to match the architecture of the system on which it is being executed.

SUMMARY

One embodiment presented herein discloses a method for managing vector element ordering. The method generally includes setting one or more control bits that determine a vector element ordering and a vector element numbering, where the one or more control bits are stored in a machine status register or in a page table entry. The vector element ordering includes one of a big-endian mode and a little-endian mode, and the vector element numbering includes one of a big-endian mode and a little-endian mode. The method includes reading the one or more control bits to determine a big-endian or a little-endian mode for the vector element ordering and for the vector element numbering. The method also includes performing a vector operation in the determined mode for the vector element ordering and the determined mode for the vector element numbering.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Embodiments presented herein disclose hardware and software means to select from a plurality of vector element orderings and vector element numberings. Embodiments described herein enable legacy systems or legacy applications that use vector element ordering from left (L) to right (R) to work with R to L data ordering without altering the vector element ordering or the source code.

Vector data ordering comprises two types of ordering: how the elements within a vector are ordered (vector element ordering), and how the bytes within a vector element are ordered. Embodiments described herein allow the use of L to R vector element ordering even if the byte ordering is R to L within the element. Embodiments described herein also address the interoperability of source code. Portions of code are identified that use L to R ordering, and portions of code are identified that use R to L ordering. Code may be assembled, compiled, and run without the need for rewriting the code.

Another embodiment described herein uses a control bit or bits to indicate whether the system is L to R or R to L. A control bit or bits in a machine status register (MSR) may be set to indicate the ordering. In another embodiment, a control bit or bits in a page table entry (PTE) may be set to indicate the ordering. For a block of memory like a page, the control bit or bits indicate whether the block uses BE or LE. Accesses to memory utilize the page table, so every access knows the ordering that is used for an instruction dispatched from that block of memory. The control bits in the MSR and the PTE are discussed in further detail below.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
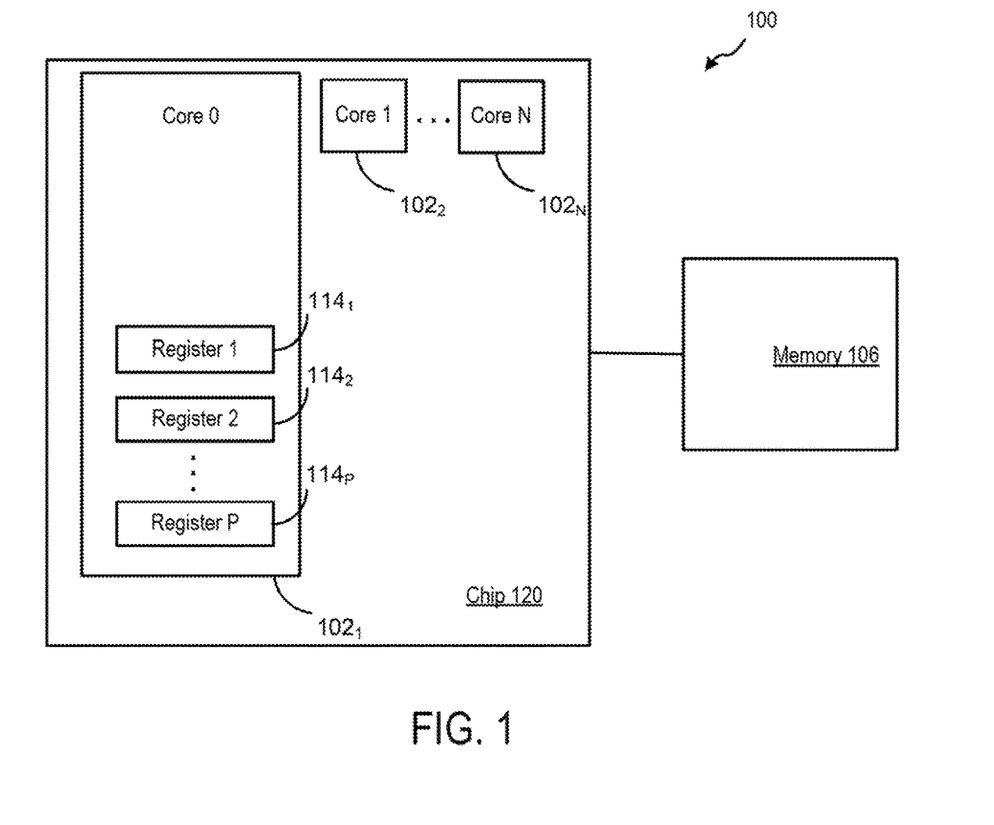
FIG. 1 illustrates an example multi-core processor, according to one embodiment.

FIG. 1 illustrates a computer system 100 according to one embodiment for managing vector element operations in accordance with BE or LE computer code. The computer system 100 includes a chip 120 that includes one or more processor cores 102, shown as Core 1, Core 2, . . . , Core N. Embodiments described herein may utilize any number N of processor cores. In other embodiments, components of system 100 shown as on chip 120 may be located off the chip, and components of system 100 shown as off chip 120 may be located on the chip.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Memory 106 is operable to store data that may be retrieved for vector operations.

Computer system 100 also comprises registers 114. Embodiments described herein may utilize any number P of registers 114, and each register 114 may be any length. Registers 114 store bits of information that can be read out or written. Registers 114 may be vector registers, general purpose registers, special purpose registers, or any other suitable register type. Registers 114 are illustrated only within Core 0 in this figure for simplicity, although the other cores may also include any number of registers.

Figure 2A:
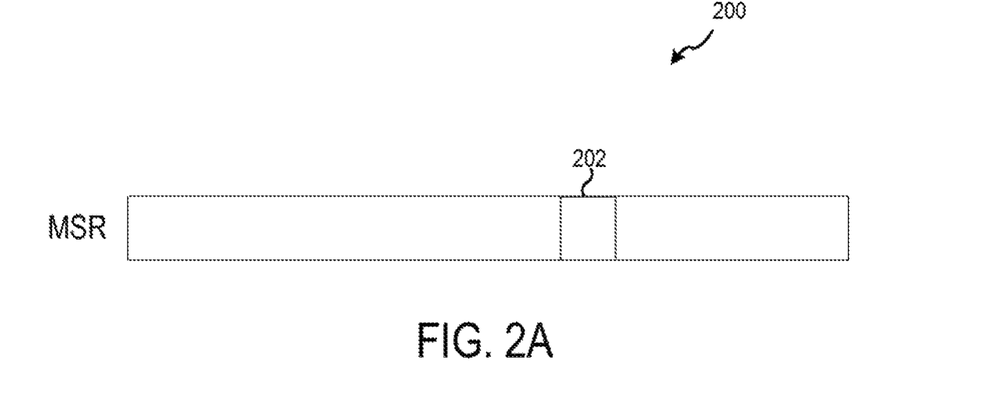
FIGS. 2A and 2B illustrate example embodiments of a machine status register.
Figure 2B:
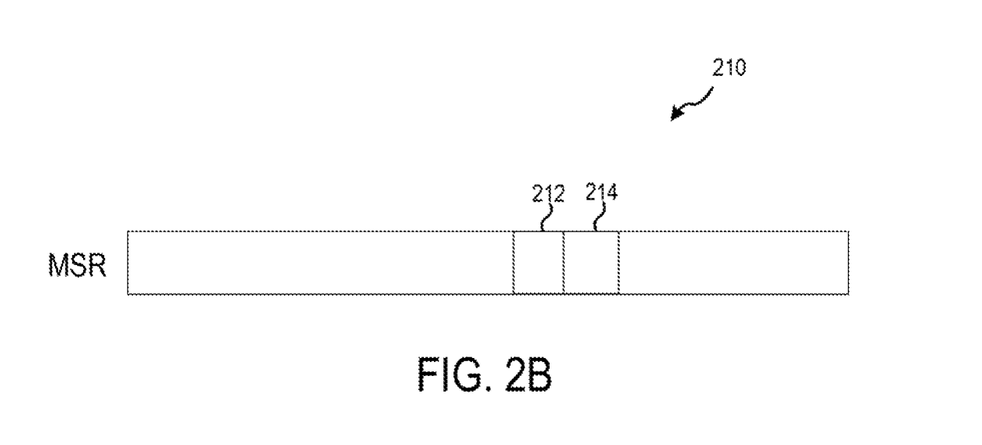

FIGS. 2A and 2B illustrate example embodiments of an MSR 200 and an MSR 210, respectively. The MSR stores various configuration bits for a computing system or a processor. The MSR is a hardware register that stores bits that may be set or cleared by the result of various operations. The bits define various configuration attributes of the system. In one embodiment, the MSR may store a single bit that indicates vector element ordering and vector element numbering. As an example, MSR 200 illustrated in FIG. 2A includes a bit 202. The bit 202 indicates both the vector element ordering and the vector element numbering. If bit 202 is set to 0, R to L vector element ordering and R to L vector element numbering are utilized in the system. If bit 202 is set to 1, L to R vector element ordering and L to R vector element numbering are utilized in the system. The reverse could be true in other embodiments (0 indicates L to R, and 1 indicates R to L).

MSR 210 illustrated in FIG. 2B includes two separate bits (212 and 214) that indicate the vector element numbering and the vector element ordering. In one example, bit 212 indicates the vector element numbering (1 indicates L to R, and 0 indicates R to L, or vice versa) and bit 214 indicates the vector element ordering (1 indicates L to R, and 0 indicates R to L, or vice versa). In this embodiment, the vector element numbering and the vector element ordering can be set independently of one another due to the separate bits being used in MSR 210.

In some embodiments, bits in the MSR are only modifiable by supervisor software, like an operating system or hypervisor or system firmware. This is implemented to prevent application software or other software from altering bits in the MSR and causing unintended effects on other processes. However, in some embodiments described herein it is desirable to allow application software (i.e., an application-level instruction) to modify the MSR, such as by setting the vector element numbering and vector element ordering bit or bits. If application software is not allowed to modify the MSR, a system call is needed to supervisor software to alter the bit or bits. System calls can take a large number of processing cycles to complete, which impacts performance. Therefore it is desirable for application code to be able to alter at least this bit or bits.

Another aspect of the current disclosure is an instruction that enables a vector element ordering and/or vector element numbering bit in the MSR to be changed from a user state without changing other bits in the MSR. One such instruction is MTVEO: Move to Vector Element Order:

MTVEO VEOIMM

MSR[VEO]<=VEOIMM

In accordance with at least one embodiment, the notation x[y] indicates the bit or bit field y of a register x. In accordance with at least one embodiment, the operator x<=y corresponds to assigning the value y to writeable register of field of a register x. In accordance with one embodiment, VEOIMM corresponds to an immediate value such as "0" or "1" indicating a vector element ordering.

The value specified in the VEOIMM field is placed into the vector element ordering and/or numbering field MSR [VEO]. If VEOIMM=0, MSR[VEO] is set to 0. The vector element ordering is set to a first order (such as L to R, or R to L, or to the same order as the active byte order). If VEOIMM=1, MSR[VEO] is set to 1. The vector element ordering is set to a second order (such as L to R, or R to L, or to the opposite order from the active byte order). The effects of executing MTVEO are immediately effective for subsequent storage accesses.

In another embodiment, if there are two separate bits in the MSR that indicate the vector element numbering and the vector element ordering, separate instructions or sub-instructions may be used that allow modification of either or both of the two bits.

Another aspect of the current disclosure is an instruction that enables a vector element numbering and/or vector element ordering bit to be set from a register (Rx). On such instruction is MTVEO Rx: Move to Vector Element Order:

MTVEO Rx
MSR[VEO]<=Rx[VEO]

The bit value corresponding to the MSR[VEO] bit specified in the operand register is placed into the vector element ordering and/or numbering field MSR[VEO]. The other bits of the register Rx can be ignored. In one embodiment, the bit value in the operand register is in the same bit position as MSR[VEO] in the MSR. In another embodiment, another bit position is used to set the value of MSR[VEO] (for example, the least significant bit or the most significant bit). In another embodiment, if there are two separate bits in the MSR that indicate the vector element numbering and the vector element ordering, two bits may be moved from the register Rx to the appropriate bit positions in the MSR. Alternatively, two separate instructions or sub-instructions may be used.

If MSR[VEO] is set to 0, then the vector element ordering is set to a first order (such as L to R, or R to L, or to the same order as the active byte order). If MSR[VEO] is set to 1, then the vector element ordering is set to a second order (such as L to R, or R to L, or to the opposite order from the active byte order). The effects of executing MTVEO Rx are immediately effective for subsequent storage accesses.

Another aspect of the current disclosure is an instruction that assigns a bit or bits from the MSR to a general purpose register (GPR). One or more bits in the MSR are read. The value is then stored in an operand register:

MFVEO Rx
Rx<=undefined or 0
Rx[VEO]<=MSR[VEO]

The other bits of Rx may be set to a variety of values in accordance with a variety of embodiments. For example, the bits may be set to 0, 1, or undefined. In one embodiment, the bit position of Rx that is set to the value of MSR[VEO] is the same bit position as MSR[VEO] in the MSR. In another embodiment, another bit position is set to the value of MSR[VEO], such as the least or most significant bit. In one embodiment, application code may only read the bits from the MSR that are under control of the application code.

Figure 3A:
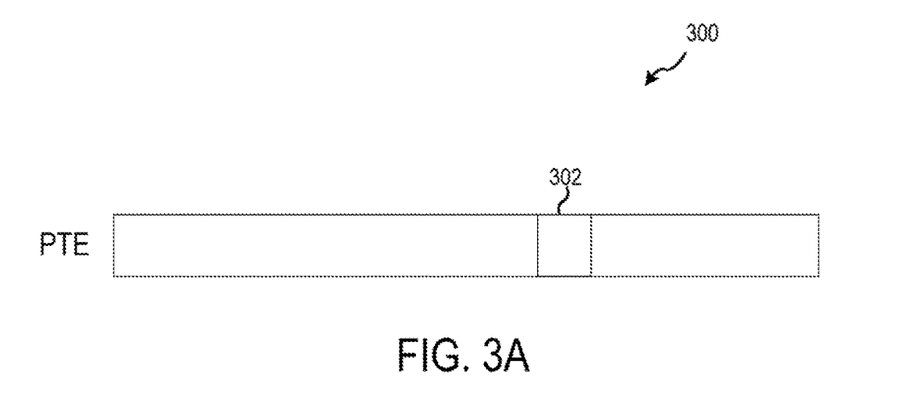
FIGS. 3A and 3B illustrate example embodiments of page table entries.
Figure 3B:
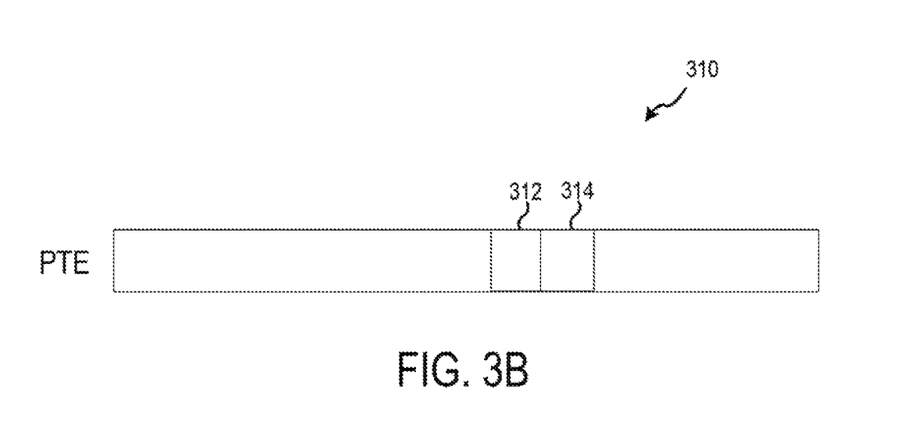

FIGS. 3A and 3B illustrate example embodiments of a page table entry (PTE) 300 and a PTE 310, respectively. Page table entries are used for address translation in systems that use virtual memory. In these embodiments, one or more bits may be used to indicate the vector element numbering and/or the vector element ordering for the respective page associated with the PTE. The bit 302 indicates both the vector element ordering and the vector element numbering. If bit 302 is set to 0, R to L vector element ordering and R to L vector element numbering are utilized for the page. If bit 302 is set to 1, L to R vector element ordering and L to R vector element numbering are utilized for the page. The reverse could be true in other embodiments (0 indicates L to R, and 1 indicates R to L).

PTE 310 illustrated in FIG. 3B includes two separate bits (312 and 314) that indicate the vector element numbering and the vector element ordering. For example, bit 312 indicates the vector element numbering (1 indicates L to R, and 0 indicates R to L, or vice versa) and bit 314 indicates the vector element ordering (1 indicates L to R, and 0 indicates R to L, or vice versa). In this embodiment, the vector element numbering and the vector element ordering can be set independently of one another due to the separate bits being used in PTE 310.

The bit or bits illustrated in FIGS. 3A and 3B are a property of an instruction address and are stored in a PTE that is used in translating the instruction address from a virtual to a physical address. The vector element numbering and/or ordering used by a particular program are a property of the source code for the program. Other bits in the PTE may be common PTE bits, e.g., in accordance with the definition of a page table entry, such as the Intel x86 architecture, z/Architecture, or Power ISA Some of the instructions that may be affected by the vector element numbering and/or ordering include load and store instructions. To properly load or store vector elements, it is necessary to know whether the ordering and/or numbering is L to R or R to L. Other instructions may be affected by element ordering and element numbering as well. For example, permute, splat variable, and instruction-immediate splat are affected.

In another embodiment, the enablement of L to R or R to L vector element order may be with the assistance of a program loader (dynamic linker), static linker, and assembler in conjunction with a PTE entry to indicate the vector element ordering. The dynamic linker, static linker, and assembler collaborate to place code based on an expected vector element ordering on suitably initialized pages in memory.

In brief, an assembler receives an indication where code is to use L to R or R to L vector element order. The receipt of the indication may be performed with an assembler directive, by selecting a particular section option control, or a particular section name. For example, the section name "textveolr" may indicate a text section with left to right vector element order. The section name "textveorl" may indicate a text section with right to left vector element order. A static linker links corresponding sections. Then, a dynamic linker/loader loads the application and sets up PTEs by indicating the requested L to R or R to L order for each page of a segment. In at least one embodiment, the operating system MMAP call (memory map) offers an option to select a vector element ordering when mapping an executable page in accordance with this disclosure.

For cases where the ordering of vector elements is encoded in the MSR, the indication of the vector element order might be the instruction MTVEO, discussed above. In cases where the PTE carries the indication of the vector element ordering, an assembler command could tell the assembler, for example, that the next X number of instructions use a specified vector element order. In another embodiment, all instructions subsequent to an assembler command establishing a vector element ordering correspond to the specified ordering until the next command establishing a new vector element ordering is received. The command could be a pseudo command to the assembler, or the command could alert the assembler to place the code in a particular named section of a file. That named section might have a convention of L to R or R to L. The assembler places code in one or the other sections. Code that is placed in the same section is then loaded by the dynamic linker to a memory page that utilizes either L to R or R to L vector element ordering.

The dynamic linker may load the various sections of code into memory. Sections generally start on a page boundary and span as many pages as needed to load that section. The dynamic linker can load the L to R section and initialize the PTEs for the pages associated with those sections to indicate that these pages all use L to R vector element ordering. The dynamic linker can then do the same for the R to L section.

In another embodiment, a section may be loaded as a segment into memory, where rather than on a page table entry basis, a segment table entry might contain a L to R or R to L order indication.

Figure 4:
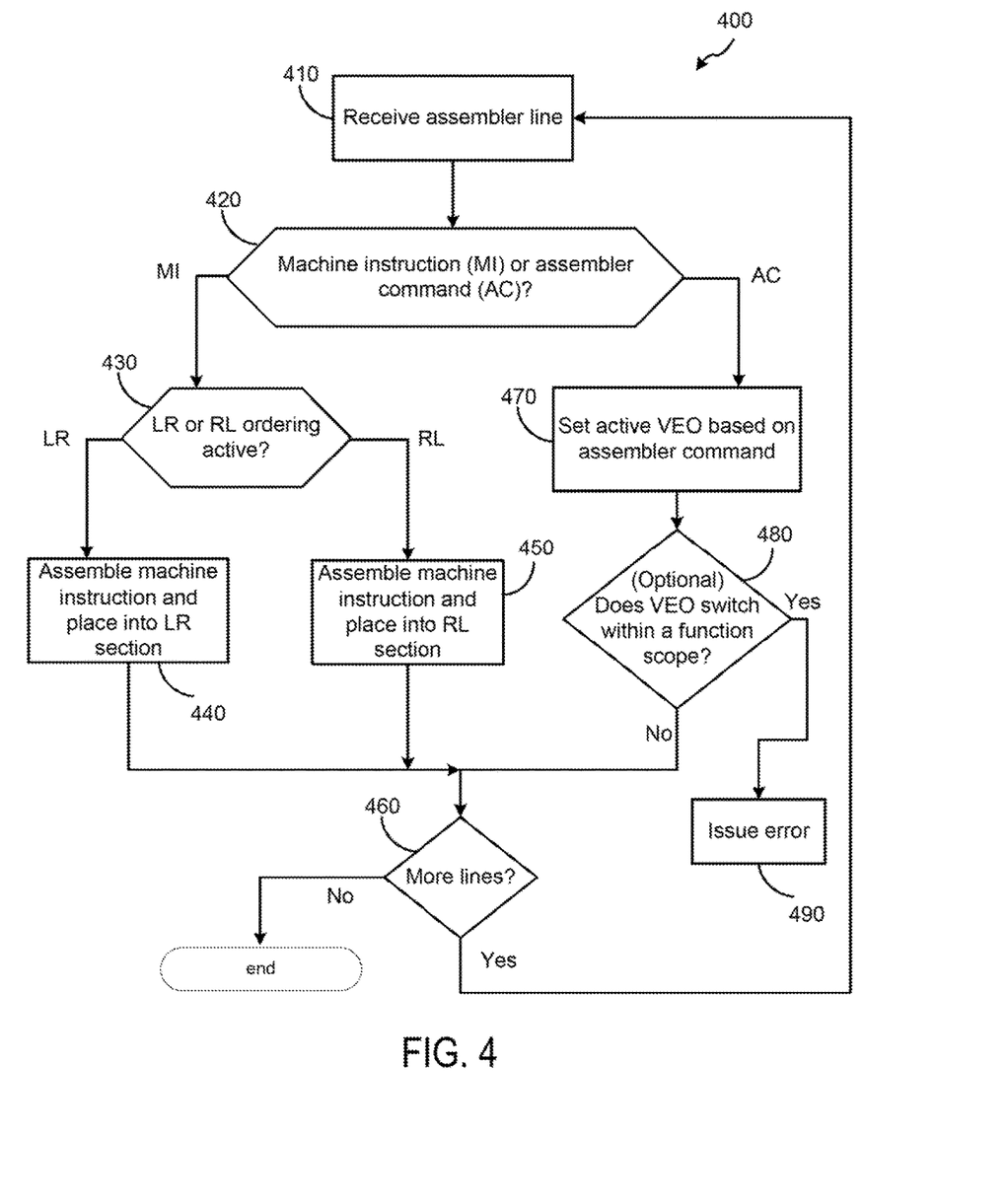
FIG. 4 is a flowchart illustrating an example method for managing vector element ordering, according to one embodiment.

FIG. 4 is a flowchart illustrating an example method 400 for managing vector element ordering, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 4. As an example, processor chip 120 can perform the steps of FIG. 4.

Method 400 describes an assembler method at the function level. Machine instructions (MI) are received in a source file and are collected into respective sections that have one or the other vector element ordering. In this embodiment, the assembler receives a file that has multiple functions and each function has a distinct vector element ordering. For each function, the vector element ordering parameter is indicated in the source file that the assembler receives. The assembler places those instructions into one or the other sections.

The method begins at step 410, where the assembler reads the source file and receives an assembler line. At step 420, the assembler determines if the line is an assembler command (AC) that indicates a new vector element order for subsequent machine instructions, or if the line is a machine instruction. If the line is an assembler command, the method proceeds to step 470.

At step 470, the assembler has received an assembler command to select a vector element order for subsequent machine instructions. Therefore, at step 470 the assembler sets the active machine instruction vector element order based on the assembler command (either L to R or R to L). This vector element order will be used for subsequent machine instructions until another assembler command changes the vector element order. As an optional step, the method may proceed to step 480 where the assembler performs a sanity check to make sure that a function does not switch vector element order within the middle of the function. The assembler may also enforce additional limitations at this step. If the sanity check fails, the assembler may issue an error at step 490.

If the sanity check of step 480 passes, or if the optional sanity check is not performed, the method proceeds to step 460 where the assembler checks for additional lines in the source file. If there are additional lines, the method proceeds back to step 410. If there are no additional lines in the source file, the method ends.

Referring back to step 420, if the line is a machine instruction, the method proceeds to step 430. At step 430, the assembler determines if L to R vector element ordering is active, or if R to L vector element ordering is active. The active vector element ordering is set in step 470 in a previous iteration of method 400 via an assembler command. That vector element ordering is in effect until altered by a subsequent assembler command. If L to R ordering is active, the method proceeds to step 440.

At step 440, the assembler assembles the machine instruction identified in step 420 into the appropriate bit pattern and places the instruction into a LR section. The method then proceeds to step 460, where the assembler checks for additional lines in the source file. If there are additional lines, the method proceeds back to step 410. If there are no additional lines in the source file, the method ends.

Referring back to step 430, the assembler determines if L to R vector element ordering is active, or if R to L vector element ordering is active. The active vector element ordering is set in step 470 in a previous iteration of method 400 via an assembler command. That vector element ordering is in effect until altered by a subsequent assembler command. If R to L ordering is active, the method proceeds to step 450.

At step 450, the assembler assembles the machine instruction identified in step 420 into the appropriate bit pattern and places the instruction into a RL section. The method then proceeds to step 460, where the assembler checks for additional lines in the source file. If there are additional lines, the method proceeds back to step 410. If there are no additional lines in the source file, the method ends.

After the method 400 ends, the result is a section of code for L to R vector element ordering and a section of code for R to L vector element ordering. Note that either of the sections may be empty if there happened to not be any code for that specific vector element ordering in this particular source file. Once the code is assembled and placed into the sections, the static linker may link corresponding sections and then the dynamic linker loads the application and sets up the PTEs for the determined vector element ordering. The code can then be executed with the proper vector element ordering.

Figure 5:
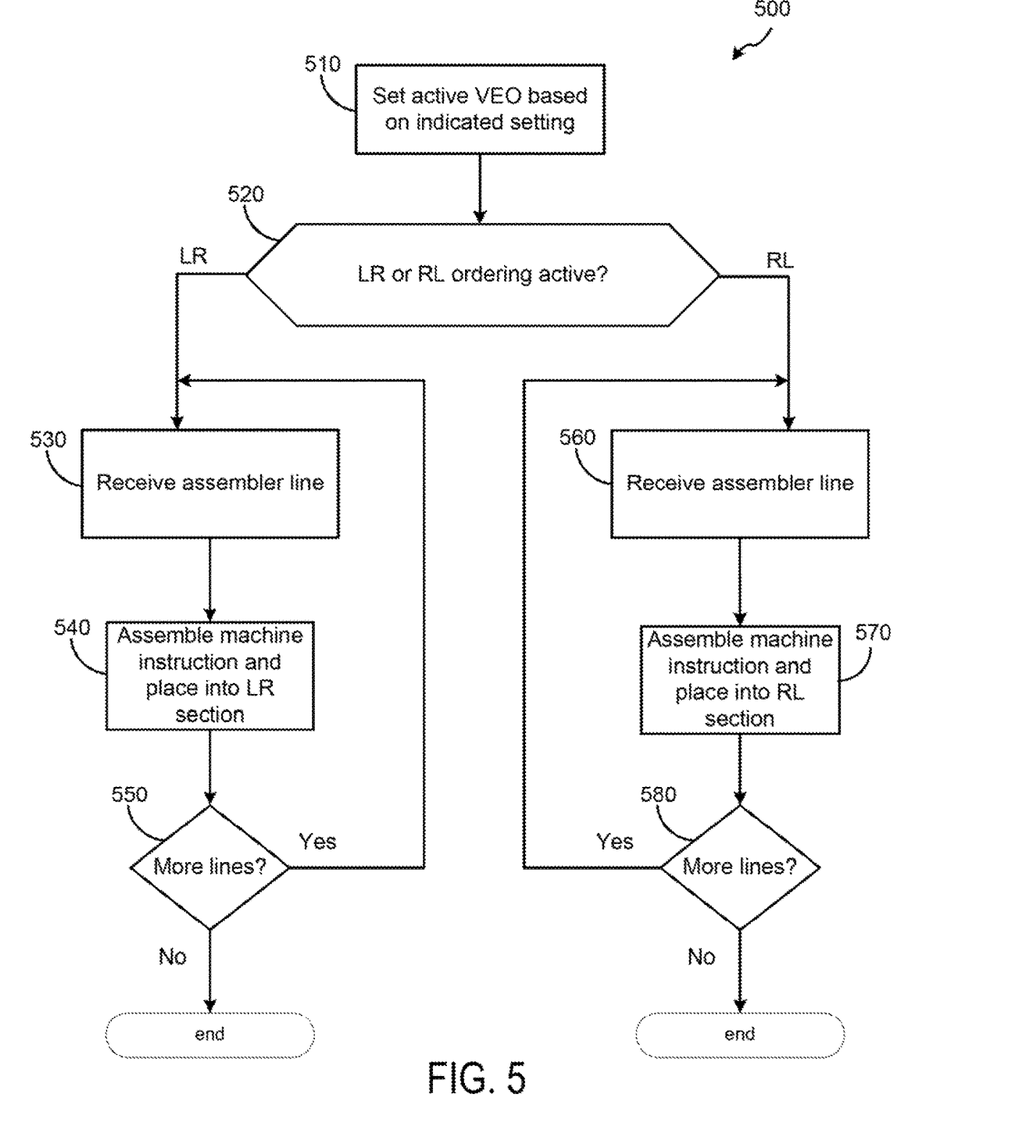
FIG. 5 is a flowchart illustrating an example method for managing vector element ordering, according to another embodiment.

FIG. 5 is a flowchart illustrating an example method 500 for managing vector element ordering, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 5. As an example, processor chip 120 can perform the steps of FIG. 5.

Method 500 describes an assembler method at the file level. In this embodiment, the assembler receives a file that has a distinct vector element ordering for the entire file. The vector element ordering parameter for the file may be indicated on a command line or in the source file that the assembler receives, for example. The assembler places the assembled instructions from the source file into the appropriate section based on the vector element ordering of the file. This embodiment is different than the embodiment described above with respect to FIG. 4 in that here the entire code does not need to be checked line by line. Instead, the vector element ordering is the same for all the code in the source file.

Method 500 begins at step 510, where the assembler receives a source file and sets an active machine instruction vector element ordering setting based on an indicated vector element ordering setting for the file scope. The indication of the vector element ordering may be in a command line. In another embodiment, the indication of the vector element ordering may be at or near the beginning of the source file. In any event, this vector element ordering is active for the entire source file.

The method proceeds to step 520, where it is determined whether L to R or R to L ordering is active. If L to R ordering is active, the method proceeds to step 530. At step 530, an assembler line is received from the source file. At step 540 the assembler assembles the assembler line received in step 530 into the appropriate bit pattern and places the instruction into a LR section. The method then proceeds to step 550, where the assembler checks for additional lines in the source file. If there are additional lines, the method proceeds back to step 530. If there are no additional lines in the source file, the method ends.

Referring back to step 520, if the assembler determines that R to L ordering is active, the method proceeds to step 560. At step 560, an assembler line is received from the source file. At step 570 the assembler assembles the assembler line received in step 530 into the appropriate bit pattern and places the instruction into a RL section. The method then proceeds to step 580, where the assembler checks for additional lines in the source file. If there are additional lines, the method proceeds back to step 560. If there are no additional lines in the source file, the method ends.

After the method 500 ends, the result is a section of code for L to R vector element ordering or a section of code for R to L vector element ordering, depending on which vector element ordering was active for the source file. Once the code is assembled and placed into the appropriate section, the static linker may link corresponding sections and then the dynamic linker loads the application and sets up the PTEs for the determined vector element ordering. The code can then be executed with the proper vector element ordering.

Figure 6:
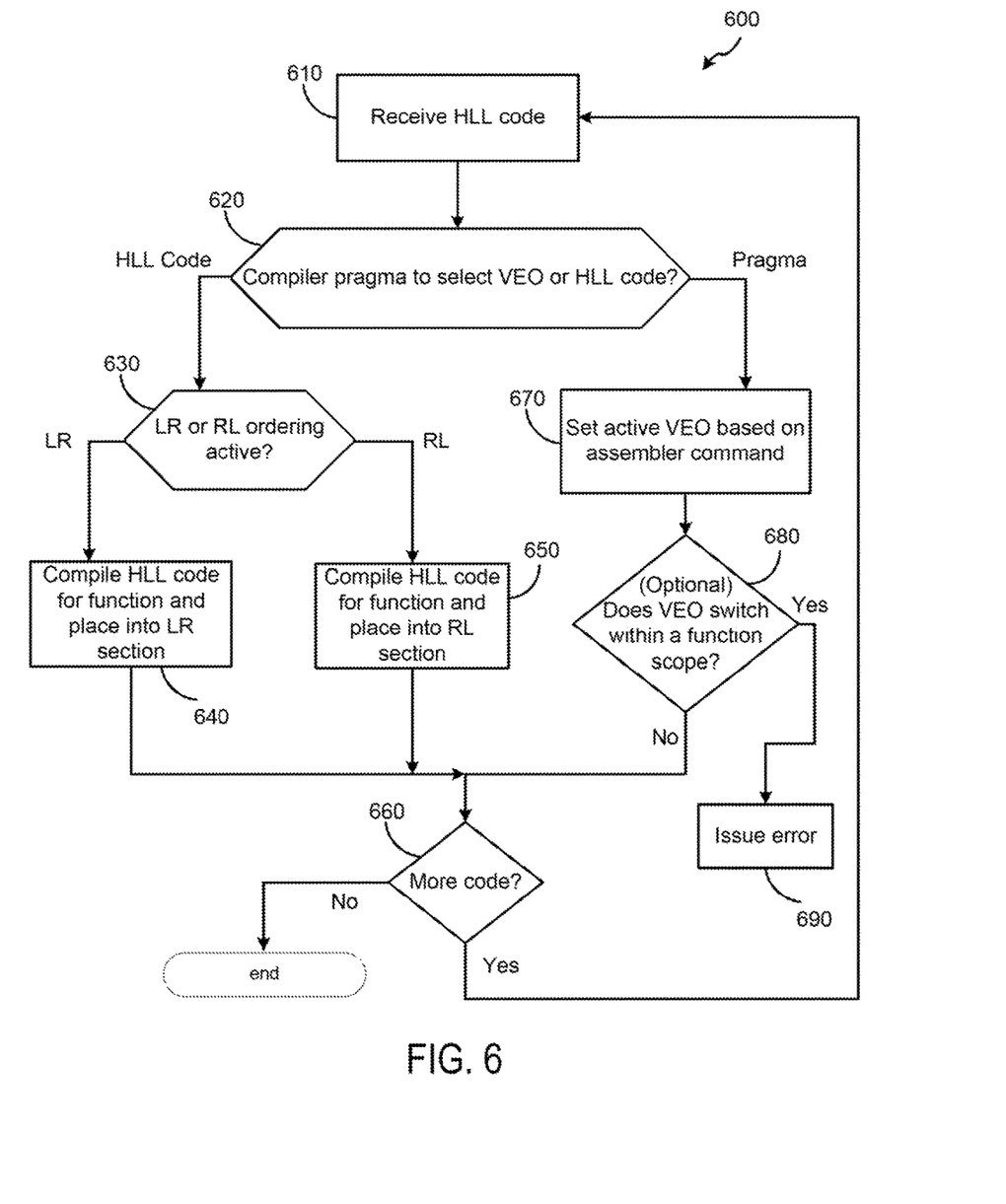
FIG. 6 is a flowchart illustrating an example method for managing vector element ordering, according to another embodiment.

FIG. 6 is a flowchart illustrating an example method 600 for managing vector element ordering, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 6. As an example, processor chip 120 can perform the steps of FIG. 6.

FIG. 6 illustrates a compiler method at the function level. High level language (HLL) in a source file is received by the compiler and the compiler generates machine language. The source file may contain code that depends on a specific vector element ordering. If the compiler generates code, it may also generate additional dependencies on a specific vector element ordering. In one embodiment, each HLL function in the source file is a pragma (a compiler command) that indicates, for the next function, machine code should be generated that uses a specific vector element ordering. The compiler can either write object code or can write assembly source code that is passed to an assembler. The compiler might either directly place the generated machine instructions into one or the other sections (L to R or R to L) or generate an indication for the assembler to place, at the beginning of a function, all subsequent machine instructions into one or the other sections (L to R or R to L).

The method begins at step 610, where HLL code is received by the compiler. The HLL code may be C, C++, Java, FORTRAN, or any other HLL code. The method proceeds to step 620, where the compiler determines whether the next piece of code in the file is a compiler pragma to select a vector element order for a subsequent function or functions, or whether the next piece of code is HLL code. If it is a compiler pragma, the method proceeds to step 670.

At step 670, the compiler has received a compiler pragma to select a vector element order for subsequent functions. Therefore, at step 670 the compiler sets the active function vector element order based on the compiler pragma (either L to R or R to L). This vector element order will be used for subsequent functions until another compiler pragma changes the vector element order. As an optional step, the method may proceed to step 680 where the compiler performs a sanity check to make sure that a function does not switch vector element order within the middle of the function. The compiler may also enforce additional limitations at this step. If the sanity check fails, the compiler may issue an error at step 690.

If the sanity check of step 680 passes, or if the optional sanity check is not performed, the method proceeds to step 660 where the compiler checks for additional HLL code in the source file. If there is additional code, the method proceeds back to step 610. If there is no additional code in the source file, the method ends.

Referring back to step 620, if HLL code is received, the method proceeds to step 630. At step 630, the compiler determines if L to R vector element ordering is active, or if R to L vector element ordering is active. The active vector element ordering is set in step 670 in a previous iteration of method 600 via a compiler pragma. That vector element ordering is in effect until altered by a subsequent compiler pragma. If L to R ordering is active, the method proceeds to step 640.

At step 640, the compiler compiles the code for the next function and places the code into a LR section. The method then proceeds to step 660, where the compiler checks for additional code in the source file. If there is additional code, the method proceeds back to step 610. If there are no additional lines in the source file, the method ends.

Referring back to step 630, the compiler determines if L to R vector element ordering is active, or if R to L vector element ordering is active. The active vector element ordering is set in step 670 in a previous iteration of method 600 via a compiler pragma. That vector element ordering is in effect until altered by a subsequent compiler pragma. If R to L ordering is active, the method proceeds to step 650.

At step 650, the compiler compiles the code for the next function and places the code into a RL section. The method then proceeds to step 660, where the compiler checks for additional code in the source file. If there is additional code, the method proceeds back to step 610. If there is no additional code in the source file, the method ends.

Figure 7:
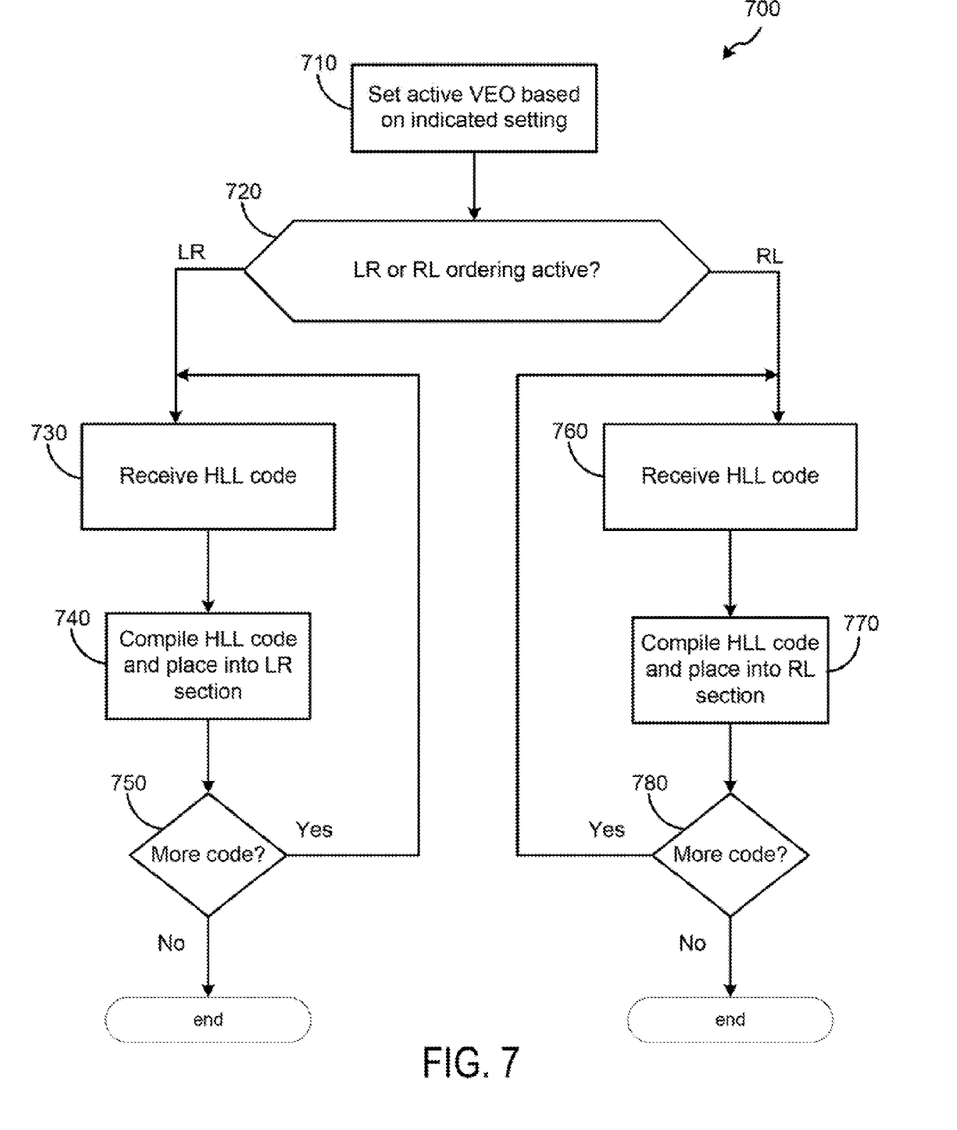
FIG. 7 is a flowchart illustrating an example method for managing vector element ordering, according to another embodiment.

FIG. 7 is a flowchart illustrating an example method 700 for managing vector element ordering, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 7. As an example, processor chip 120 can perform the steps of FIG. 7.

Method 700 describes a compiler method at the file level. In this embodiment, the compiler receives an HLL source file that has a distinct vector element ordering for the entire file. The vector element ordering parameter for the file may be indicated on a command line or in the source file that the compiler receives, for example. The compiler places the compiled instructions from the source file into the appropriate section based on the vector element ordering of the file. This embodiment is different than the embodiment described above with respect to FIG. 6 in that here the entire code does not need to be checked line by line or function by function. Instead, the vector element ordering is the same for all the code in the source file.

Method 700 begins at step 710, where the compiler receives an HLL source file and sets an active HLL code vector element ordering setting based on an indicated vector element ordering setting for the file scope. The indication of the vector element ordering may be in a command line. In another embodiment, the indication of the vector element ordering may be at or near the beginning of the HLL source file. In any event, this vector element ordering is active for the entire source file.

The method proceeds to step 720, where it is determined whether L to R or R to L ordering is active. If L to R ordering is active, the method proceeds to step 730. At step 730, HLL code is received from the source file. At step 740 the compiler compiles the HLL code received in step 730 using the active vector element order and places the compiled code into an LR section. The compiler performs this action either by writing binary object code or by generating assembler code using assembly commands in certain embodiments. The method then proceeds to step 750, where the compiler checks for additional HLL code in the source file. If there is additional code, the method proceeds back to step 730. If there is no additional code in the HLL source file, the method ends.

Referring back to step 720, if the compiler determines that R to L ordering is active, the method proceeds to step 760. At step 760, HLL code is received from the source file. At step 770 the compiler compiles the HLL code received in step 760 using the active vector element order and places the compiled code into an RL section. The compiler performs this action either by writing binary object code or by generating assembler code using assembly commands in certain embodiments. The method then proceeds to step 780, where the compiler checks for additional HLL code in the source file. If there is additional code, the method proceeds back to step 760. If there is no additional code in the HLL source file, the method ends.

After the method 700 ends, the result is compiled code for L to R vector element ordering or compiled code for R to L vector element ordering, depending on which vector element ordering was active for the source file.

While the methods of FIGS. 4, 5, 6, and 7 have been described with respect to vector element ordering, in another embodiment, these methods are used to establish vector element numbering. In at least one embodiment, distinct assembler commands for controlling vector element ordering and vector element numbering may be provided. Further, in accordance with one embodiment supporting independent vector element ordering and vector element numbering specification, four distinct sections may be present in an object corresponding to all combinations of possible vector element orderings and vector element numberings, e.g., text-veolr-venlr, text-veolr-venrl, text-veorl-venlr, text-veorl-venrl.

Further, in a preferred embodiment, data byte ordering is controlled independent of vector element ordering and vector element numbering. In a preferred embodiment, data byte ordering is preferably a function of the system architecture. On the other hand, vector element ordering and vector element numbering may be a function of code provenance, i.e., code originally developed on a big-endian system may have big endian (L to R, i.e., left to right) vector element ordering and numbering dependences regardless of the underlying byte ordering, and vice versa.

In some embodiments, a transition from one vector element ordering to another may occur in the code. Similarly, in some embodiments, code that uses one vector element ordering may call code that uses a different vector element ordering. At those transitions, a programmer may need to be cognizant of the switch. A programmer can manually make changes in the code to account for these switches, or can make provisions for the compiler to compensate for these switches. In some embodiments, the compiler may discover these transitions while compiling code. In accordance with one such embodiment, each function has an indicator for which vector element ordering it uses. If no compensation code has been detected, a linker might issue an error or warning when a call goes to a function with a different vector element ordering without making appropriate allowances. In at least one embodiment, at least one of a function call site and function symbol corresponds to an indicator whether the function expects a vector parameter in a vector register. If a function does not expect a vector parameter in a vector register, then no mismatch may be present. Consequently, calls between different text sections without vector register parameters may not elicit a warning or error during linking.

Figure 8:
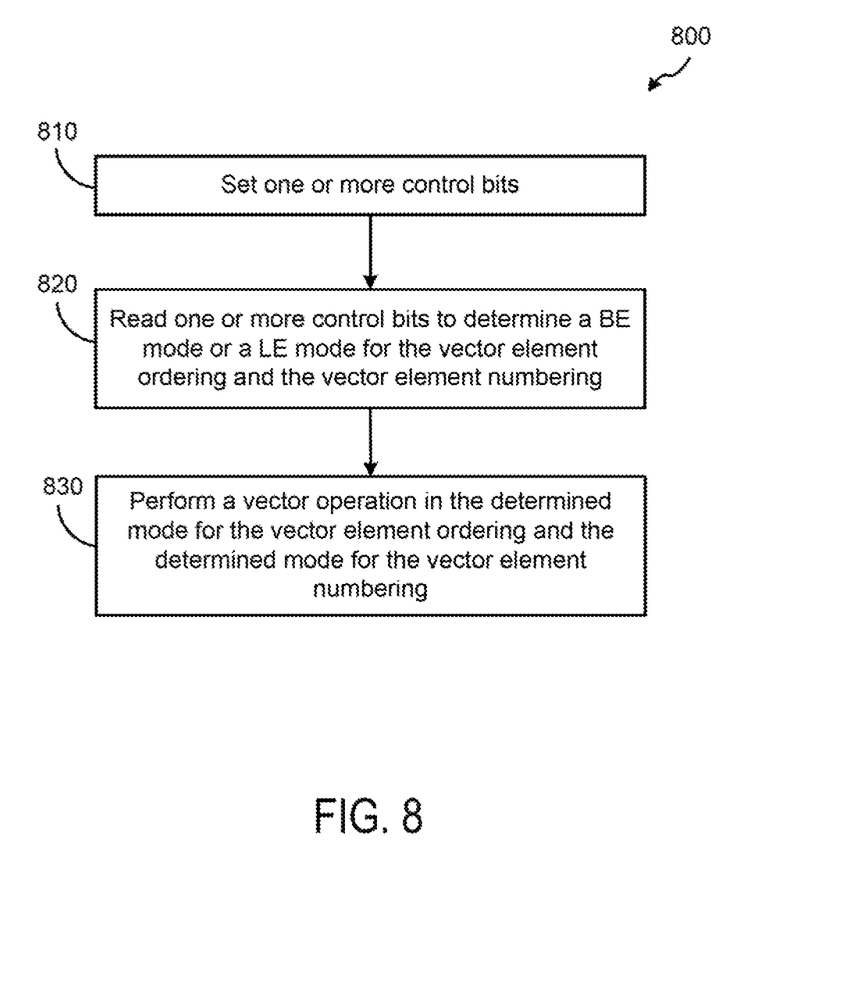
FIG. 8 is a flowchart illustrating an example method for managing vector element ordering, according to another embodiment.

FIG. 8 is a flowchart illustrating an example method 800 for managing vector element ordering, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 8. As an example, processor chip 120 can perform the steps of FIG. 8.

Method 800 begins at step 810, where one or more control bits are set that determine a vector element ordering and a vector element numbering. In some embodiments, a single control bit may determine both vector element ordering and a vector element numbering. In other embodiments, separate control bits may be used to determine vector element ordering and a vector element numbering. The one or more control bits may be stored in a machine status register or in a page table entry. The vector element ordering comprises one of a BE mode or a LE mode. The vector element numbering also comprises one of a BE mode or a LE mode. The control bits may be set by any appropriate hardware or software means.

The method proceeds to step 820, where the one or more control bits are read to determine a BE mode or a LE mode for the vector element ordering and for the vector element numbering. The control bits can be read by either hardware or software. In one example, a processor instruction may be used to read the control bit or bits.

The method proceeds to step 830, where a vector operation is performed in the determined mode for the vector element ordering and the determined mode for the vector element numbering. The vector operation may be any suitable operation. The vector element ordering mode may be either BE or LE, and the vector element numbering mode may be either BE or LE. In some embodiments these modes are the same, and in other embodiments these modes are different.

Figure 9:
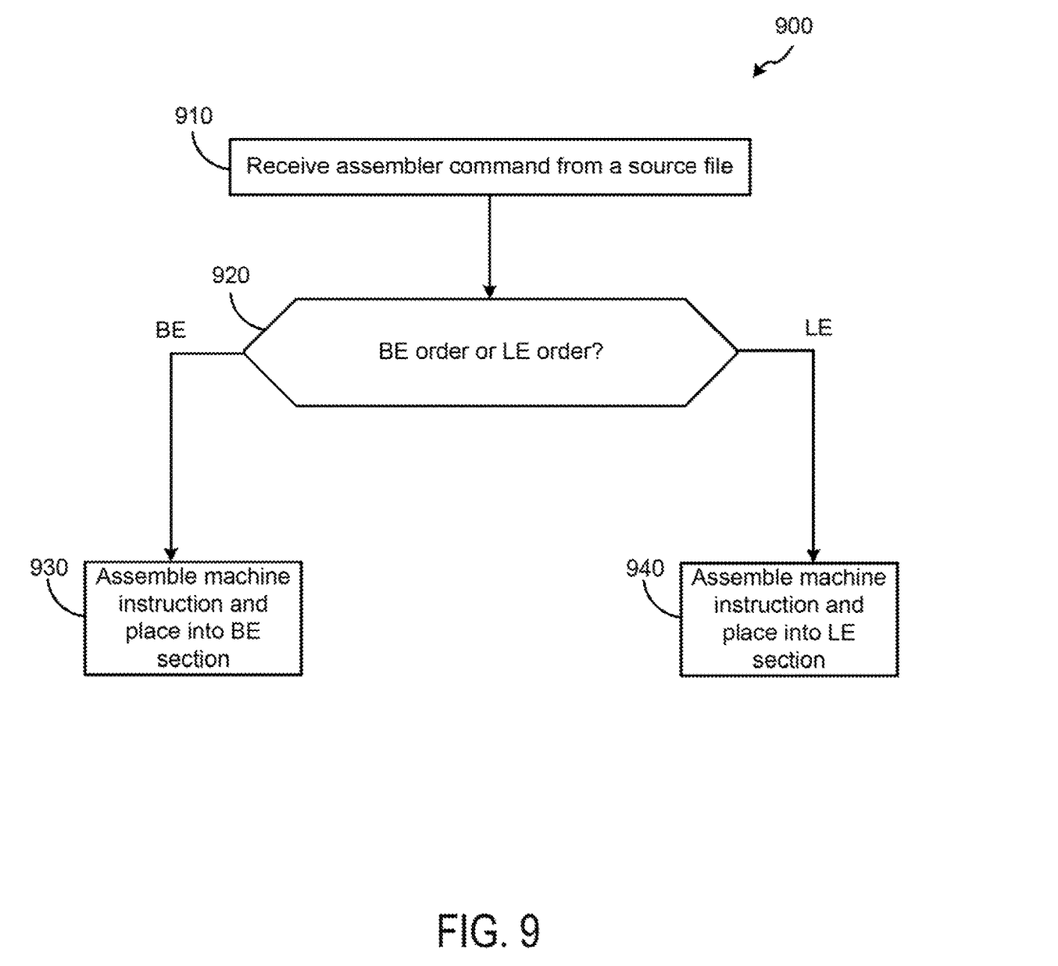
FIG. 9 is a flowchart illustrating an example method for managing vector element ordering, according to another embodiment.

FIG. 9 is a flowchart illustrating an example method 900 for managing vector element ordering, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 9. As an example, processor chip 120 can perform the steps of FIG. 9.

Method 900 begins at step 910, where an assembler command is received from a source file. The assembler command indicates a vector element order for one or more subsequent machine instructions in the source file.

The method proceeds to step 920, where it is determined whether the vector element order is BE or LE. This determination may be made in a number of ways as described above. As an example, the indication of the vector element order may be in a command line. In another embodiment, the indication of the vector element ordering may be at or near the beginning of the source file. If the vector element order is BE, the method proceeds to step 930. At step 930, one or more subsequent machine instructions are assembled and placed in a BE section of a file. These subsequent machine instructions will be executed in a BE mode.

Referring back to step 920, if the vector element order is LE, the method proceeds to step 940. At step 940, one or more subsequent machine instructions are assembled and placed in a LE section of a file. These subsequent machine instructions will be executed in a LE mode.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer implemented method for managing vector element ordering, comprising:
    setting a first control bit that determines a vector element ordering, wherein the single first control bit is stored in a page table entry, wherein the vector element ordering comprises one of a big-endian (BE) mode and a little-endian (LE) mode, wherein vector element ordering specifies how elements within a vector of elements are ordered, wherein each element in the vector includes a plurality of bytes;
    setting a second control bit that determines a vector element numbering, wherein the second control bit is stored in the page table entry, wherein the vector element numbering comprises one of the BE mode and the LE mode, and wherein vector element numbering specifies how bytes of the plurality of bytes within an element are ordered;
    reading the first control bit to determine which one of the BE mode and the LE mode for the vector element ordering is indicated;
    reading the second control bit to determine which one of the BE mode and the LE mode for the vector element numbering is indicated; and
    performing a vector operation in the determined mode for the vector element ordering and the determined mode for the vector element numbering.

2. The computer implemented method of claim 1, wherein the first control bit and the second control bit are set by a machine instruction.

3. The computer implemented method of claim 2, wherein an instruction sets the first control bit and the second control bit to a mode opposite an active mode.

4. The computer implemented method of claim 1, wherein setting the first control bit and the second control bit further comprises setting the single control bit in the page table entry with an application-level instruction.

5. The computer implemented method of claim 1, wherein setting the first control bit further comprises setting the first control bit by reading a register and copying a value for the first control bit to the page table entry.

6. A computer program product for managing vector element ordering, the computer program product comprising a non-transitory computer-readable storage medium having computer-readable program code embodied therewith, the computer-readable program code executable by a processor to cause the processor to:
    set a first control bit that determines a vector element ordering, wherein the first control bit is stored in a page table entry, wherein the vector element ordering comprises one of a big-endian (BE) mode and a little-endian (LE) mode, wherein vector element ordering specifies how elements within a vector of elements are ordered, and wherein each element of the elements within the vector includes a plurality of bytes;
    set a second control bit that determines a vector element numbering, wherein the second control bit is stored in the page table entry, wherein the vector element numbering comprises one of the BE mode and the LE mode, and wherein vector element numbering specifies how bytes of the plurality of bytes within an element are ordered;
    read the first control bit to determine which one of the BE mode and the LE mode for the vector element ordering is indicated;
    read the second control bit to determine which one of the BE mode and the LE mode for the vector element numbering is indicated; and
    perform a vector operation in the determined mode for the vector element ordering and the determined mode for the vector element numbering.

7. The computer program product of claim 6, wherein the first control bit and the second control bit are set by a machine instruction.

8. The computer program product of claim 7, wherein an instruction sets the first control bit and the second control bit to a mode opposite an active mode.

9. The computer program product of claim 6, wherein setting the first control bit and the second control bit further comprises setting the first control bit and the second control bit in the machine status register with an application-level instruction.

10. The computer program product of claim 6, wherein setting the first control bit and the second control bit further comprises setting the first control bit and the second control bit by reading a register and copying a value for the first control bit and the second control bit to the machine status register.

11. A system, comprising:
    a processor; and
    a memory storing a program, which, when executed on the processor, performs an operation for managing vector element ordering, the operation comprising:
        setting a first control bit that determines a vector element ordering, wherein the first control bit is stored in a page table entry, wherein the vector element ordering comprises one of a big-endian (BE) mode and a little-endian (LE) mode, wherein vector element ordering specifies how elements within a vector of elements are ordered, wherein each element in the vector includes a plurality of bytes;
        setting a second control bit that determines a vector element numbering, wherein the second control bit is stored in the page table entry, wherein the vector element numbering comprises one of the BE mode and the LE mode, and wherein vector element numbering specifies how bytes of the plurality of bytes within an element are ordered;

reading the first control bit to determine which one of the BE mode and the LE mode for the vector element ordering is indicated;

reading the second control bit to determine which one of the BE mode and the LE mode for the vector element numbering is indicated; and performing a vector operation in the determined mode for the vector element ordering and the determined mode for the vector element numbering.

12. The system of claim 11, wherein the first control bit and the second control bit are set by a machine instruction.

13. The system of claim 11, wherein setting the first control bit and the second control bit further comprises setting the first control bit and the second control bit in the machine status register with an application-level instruction.

14. The system of claim 11, wherein setting the first control bit and the second control bit further comprises setting the first control bit and the second control bit by reading a register and copying a value for the first control bit and the second control bit to the machine status register.

* * * * *